(12) United States Patent
Allen

(10) Patent No.: US 10,562,339 B2
(45) Date of Patent: Feb. 18, 2020

(54) DOOR SKIN, A METHOD OF ETCHING A PLATE FOR FORMING A WOOD GRAIN PATTERN IN THE DOOR SKIN, AND AN ETCHED PLATE FORMED THEREFROM

(71) Applicant: Masonite Corporation, Tampa, FL (US)

(72) Inventor: Robert C. Allen, Elburn, IL (US)

(73) Assignee: Masonite Corporation, Tampa, FL (US)

(*) Notice: Subject to any disclaimer, the term of this patent is extended or adjusted under 35 U.S.C. 154(b) by 171 days.

(21) Appl. No.: 15/688,399

(22) Filed: Aug. 28, 2017

(65) Prior Publication Data

US 2017/0355220 A1 Dec. 14, 2017

Related U.S. Application Data

(62) Division of application No. 14/709,012, filed on May 11, 2015, now Pat. No. 9,744,801.

(60) Provisional application No. 61/990,853, filed on May 9, 2014.

(51) Int. Cl.
*E06B 3/70* (2006.01)
*B44F 9/02* (2006.01)
*B29C 59/02* (2006.01)
*B44B 5/02* (2006.01)
*B44C 5/04* (2006.01)

(52) U.S. Cl.
CPC .......... *B44C 5/0453* (2013.01); *B29C 59/022* (2013.01); *B44B 5/026* (2013.01); *B44C 5/04* (2013.01); *B44F 9/02* (2013.01); *E06B 3/7001* (2013.01); *B29K 2905/00* (2013.01); *Y10T 428/24066* (2015.01); *Y10T 428/24438* (2015.01)

(58) Field of Classification Search
CPC ........ E06B 3/7001; B44F 9/02; B29C 59/022; B44B 5/026; Y10T 428/24438; Y10T 428/24066
See application file for complete search history.

(56) References Cited

U.S. PATENT DOCUMENTS 2,724,642 A * 11/1955 Brown ...................... B44F 9/02
                                                        101/169
4,136,224 A * 1/1979 Minami .................. B32B 27/00
                                                        428/151
5,075,059 A * 12/1991 Green ................. B29C 37/0025
                                                        264/129

(Continued)

FOREIGN PATENT DOCUMENTS

WO 2004067291 A2 8/2004

*Primary Examiner* — Ryan D Kwiecinski
(74) *Attorney, Agent, or Firm* — Berenato & White, LLC

(57) ABSTRACT

A door skin featuring a facing having an exterior surface and an interior surface can be provided. A wood grain pattern portion can be formed in the exterior surface of the facing. The wood grain pattern portion can feature a plurality of grooves formed in the exterior surface of the facing, the grooves are recessed from a first plane of the exterior surface, and tonal portions formed in the exterior surface of the facing. The tonal portions can include at least a first protrusion, a second protrusion, and a third protrusion. Spacing between the first protrusion and the second protrusion can be different from spacing between the second protrusion and the third protrusion.

20 Claims, 13 Drawing Sheets

(56) References Cited

U.S. PATENT DOCUMENTS

| | | | | |
|---|---|---|---|---|
| 5,429,857 | A * | 7/1995 | Amemiya | B41M 3/06 428/151 |
| 5,534,352 | A * | 7/1996 | Pittman | A47B 96/206 118/72 |
| 5,540,026 | A * | 7/1996 | Gartland | B27M 3/0093 156/245 |
| RE36,240 | E * | 6/1999 | Minke | E06B 3/78 264/129 |
| 5,939,143 | A * | 8/1999 | Findley | A47B 96/201 156/277 |
| 6,389,768 | B1 * | 5/2002 | Gagne | B29C 51/02 52/309.9 |
| 6,479,128 | B1 * | 11/2002 | Schafernak | B27N 3/00 144/358 |
| 6,485,800 | B1 * | 11/2002 | Liittschwager | B29C 44/1233 428/15 |
| 6,487,824 | B1 * | 12/2002 | West | C08L 67/06 52/309.1 |
| 6,579,593 | B1 | 6/2003 | Mori et al. | |
| 6,899,835 | B2 * | 5/2005 | Liittschwager | B29C 44/1233 264/129 |
| 6,952,903 | B2 * | 10/2005 | West | B29C 43/003 52/309.9 |
| 6,988,342 | B2 * | 1/2006 | Luetgert | B44C 5/04 52/313 |
| 7,137,232 | B2 * | 11/2006 | Lynch | E06B 3/7001 52/784.1 |
| 7,338,612 | B2 | 3/2008 | Luetgert et al. | |
| 7,367,166 | B2 * | 5/2008 | Luetgert | B29C 33/424 428/151 |
| 7,686,969 | B2 | 3/2010 | Sibbett | |
| 7,820,268 | B2 * | 10/2010 | Luetgert | B44C 5/04 428/151 |
| 7,959,817 | B2 | 6/2011 | Luetgert et al. | |
| 8,201,333 | B2 | 6/2012 | Wysock et al. | |
| 8,246,339 | B2 | 8/2012 | Luetgert et al. | |
| 8,535,471 | B2 | 9/2013 | Luetgert et al. | |
| 8,697,226 | B2 * | 4/2014 | Luetgert | B44C 5/04 428/156 |
| 8,950,139 | B2 * | 2/2015 | Luetgert | E06B 3/7001 52/313 |
| 8,993,094 | B2 * | 3/2015 | Luetgert | B44C 5/04 428/151 |
| 9,416,585 | B2 * | 8/2016 | Luetgert | E06B 3/7001 |
| 9,719,288 | B2 * | 8/2017 | Luetgert | E06B 3/7001 |
| 9,744,801 | B2 | 8/2017 | Allen | |
| 10,047,556 | B2 * | 8/2018 | Luetgert | E06B 3/7001 |
| 2002/0086107 | A1 * | 7/2002 | Paxton | B27N 3/08 427/254 |
| 2002/0119399 | A1 | 8/2002 | Leskanic | |
| 2003/0218663 | A1 * | 11/2003 | Baxter | B41J 3/4073 347/102 |
| 2004/0139673 | A1 * | 7/2004 | Luetgert | B44C 5/04 52/313 |
| 2004/0221531 | A1 * | 11/2004 | Lynch | E06B 3/7001 52/455 |
| 2005/0166402 | A1 * | 8/2005 | Liittschwager | B29C 44/1233 29/897.32 |
| 2006/0071993 | A1 * | 4/2006 | Baxter | B41J 3/4073 347/101 |
| 2006/0117691 | A1 * | 6/2006 | Luetgert | B44C 5/04 52/313 |
| 2007/0026197 | A1 * | 2/2007 | Suga | B29C 45/14811 428/172 |
| 2011/0036033 | A1 | 2/2011 | Luetgert | |

\* cited by examiner

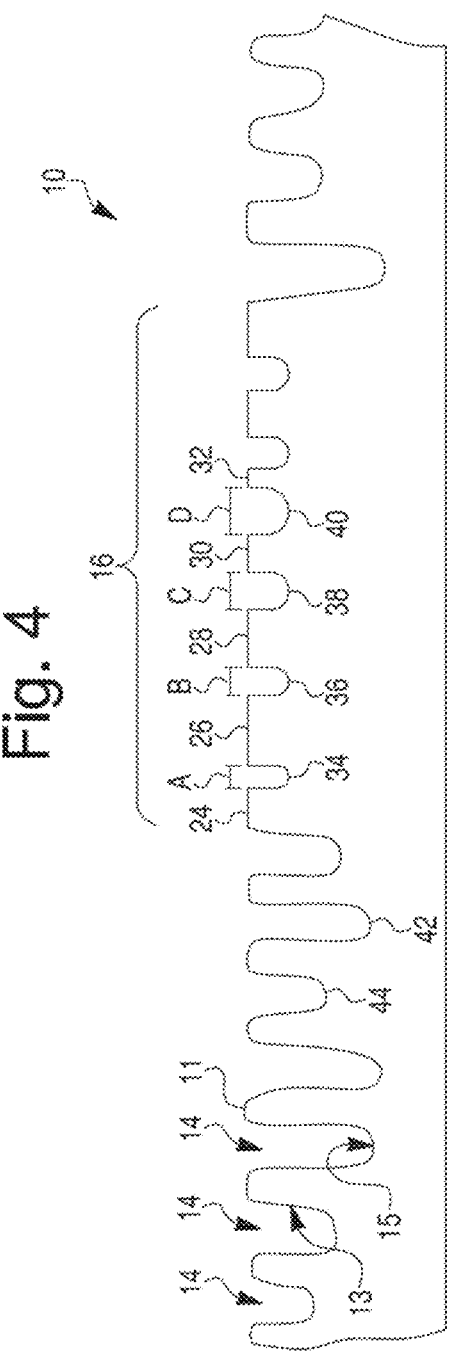
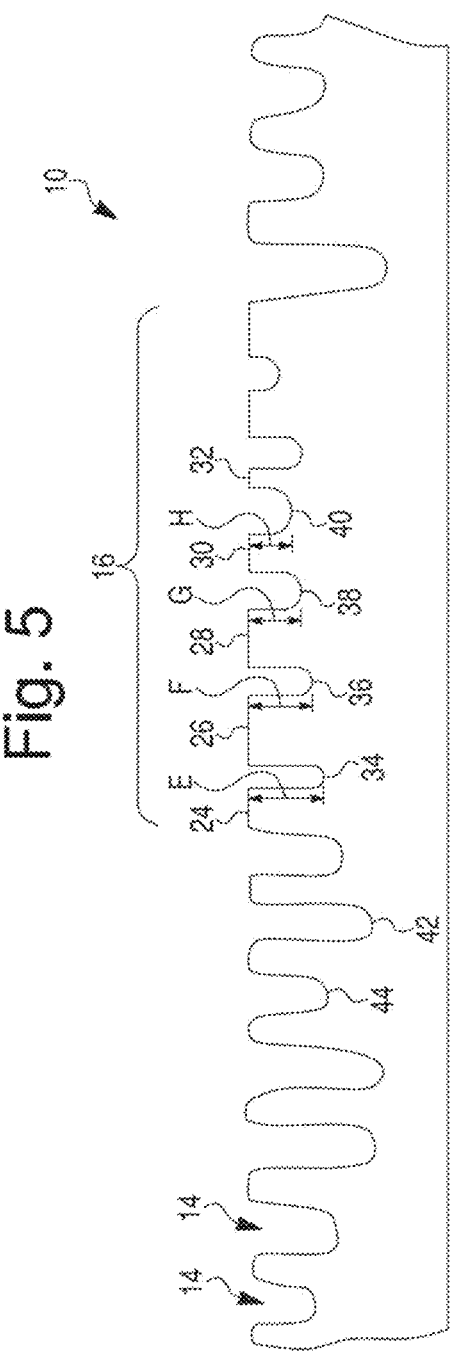

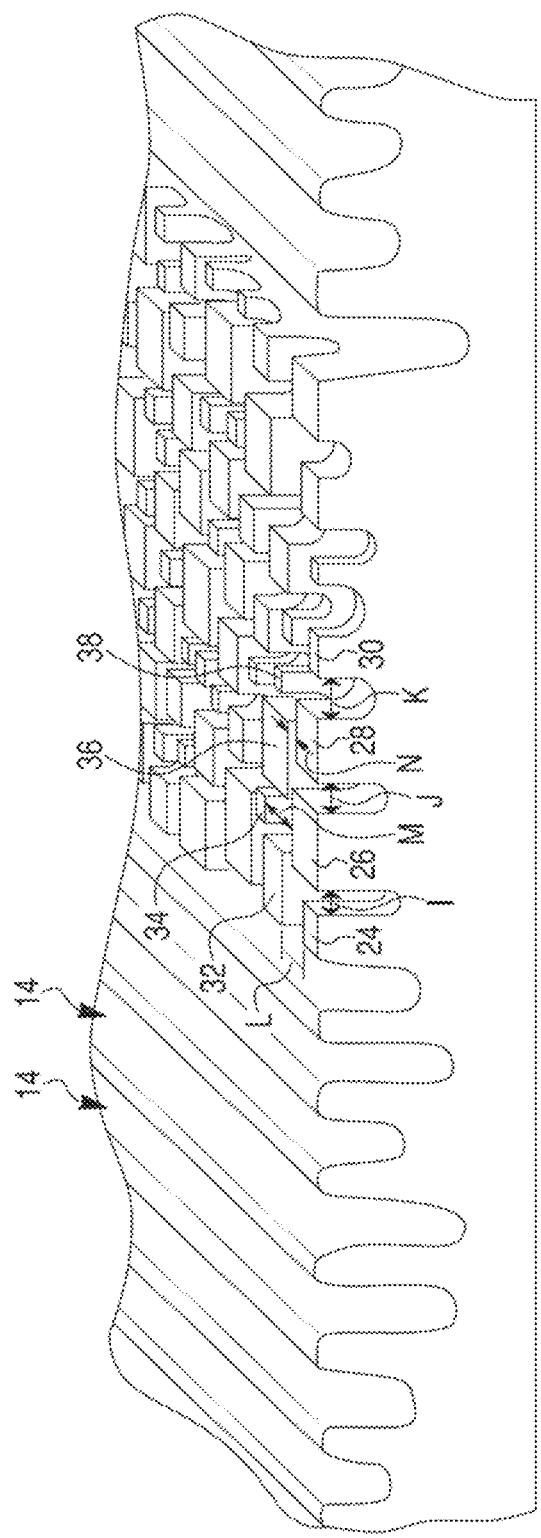

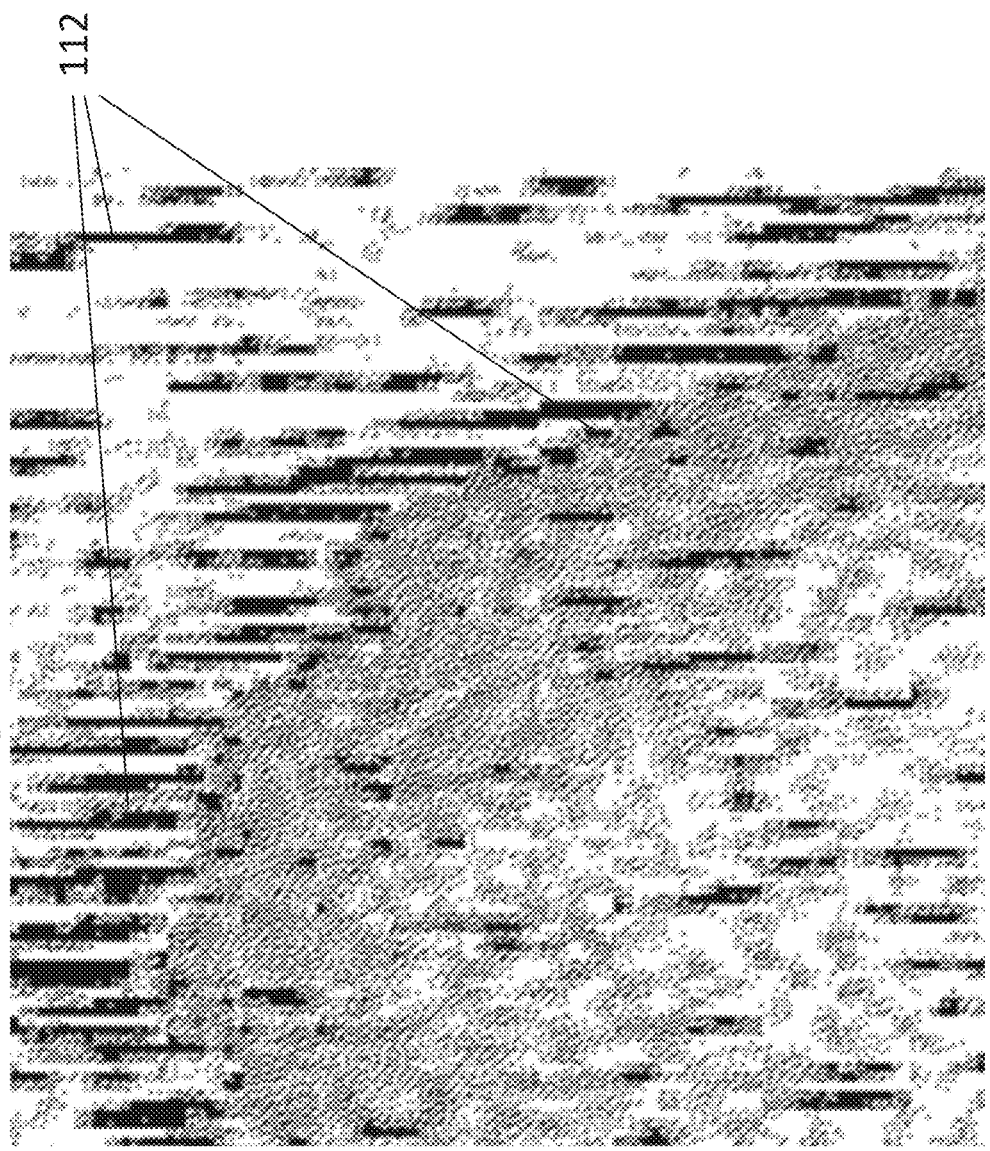

ND, A METHOD OF ETCHING A
PLATE FOR FORMING A WOOD GRAIN
PATTERN IN THE DOOR SKIN, AND AN
ETCHED PLATE FORMED THEREFROM

This application claims priority to U.S. application Ser. No. 14/709,012, filed May 11, 2015 and claims benefit to U.S. Provisional Patent Application No. 61/990,853, filed May 9, 2014, both which are incorporated herein by reference.

FIELD OF THE INVENTION

The present invention is directed to an interior or exterior passage door, door skin (sometimes called door facing) or other molded article, such as wainscot, furniture door, cabinet door, decorative molding, trim product, paneling, millwork, or the like, having a naturally appearing wood grain pattern formed in an exterior surface. The wood grain pattern has a plurality of grooves formed in the exterior surface. The grooves are recessed from the exterior surface. Tonal portions are also formed in the exterior surface. The tonal portions include at least a first protrusion, a second protrusion, and a third protrusion, wherein spacing between the first protrusion and the second protrusion is different than spacing between the second protrusion and the third protrusion. The invention is also directed to a method of etching a plate, for use as an embossing plate or with a molded die set, for forming a wood grain pattern in the exterior surface of the door skin or molded article and the resulting etched plate.

BACKGROUND

A wood grain pattern is created by cells that make up a piece of natural wood. As the piece of wood is processed, the cells are split open exposing pores in the wood. The pores create a pattern of valleys and rifts that result in the wood grain pattern. Valleys are large pores that are long and narrow and have a texture and depth such that they are easily discernable within a grain pattern. Rifts are smaller pores that are less distinct. The rifts can have various sizes and be randomly spaced at variable concentrations throughout the grain pattern based on the cell formation of the wood. Because rifts create less contrast, the rifts contribute to a subtle tonal background pattern within the wood grain pattern.

Recreating a natural wood grain pattern in a molded article such as a door skin is difficult. Traditionally, an image of a natural wood grain pattern has been used to recreate the wood grain pattern in the molded article. For example, a line pattern image based on the image of the natural wood grain can be printed onto an exterior surface of the door skin. However, the printed pattern created on the door skin is two dimensional and lacks the depth or texture found in the natural wood grain pattern. Moreover, depositing print ink directly onto the door skin creates a wood grain pattern that may lack crisp definition of wood grain lines and adequate contrast of varying tones found in the background of the natural wood grain pattern.

In an attempt to add depth and texture to create a more realistic wood grain pattern, a door skin can be pressed with an embossing plate etched with a wood grain pattern. The wood grain pattern of the embossing plate can be created from an image of the natural wood grain pattern where the image includes ticks that correspond to the valleys within the image of the wood grain pattern and background tonal portions that correspond with the rifts. The embossing plates can be etched by patterning a resist on the metal and subjecting the surface to acid to remove portions of the metal plate creating a textured surface including the tick and tonal patterns. The etched plate is thus a negative of the pattern to be formed in the door skin.

Due to limitations arising during the process of etching the embossing plate, the size, shape, and configuration of the wood grain pattern associated with the tick and tonal portions can create inaccurate formations. For instance, when walls of the plate between adjacent ticks and/or tonal portions are too narrow, the acid used to etch the embossing plate can eat into the sides of the tick and/or tonal portions, destroying delineation between adjacent ticks and/or tonal portions. In order to prevent the acid from etching between adjacent ticks and/or tonal portions, the image of the natural wood grain pattern can be modified such that the ticks and/or tonal portions are spaced apart a predetermined distance. For example, tonal portions can be arranged in a geometric pattern where all projections within a tonal portion are uniformly spaced from one another. However, the resulting wood grain pattern embossed into the door skin may not accurately resemble a natural wood pattern and can create a configuration and/or appearance that upon close appearance may not appear realistic.

Therefore, there is a need for an embossing plate for molding a door skin or other molded article with a wood grain pattern that more accurately captures the subtle contrasts necessary to create realistically appearing wood ticks and background tonal portions as found in a natural wood grain pattern. Yet a further need in the art is to form an embossing plate useful to create a door skin having wood grain pattern with features and surface characteristics acceptable to consumers both aesthetically and from a price point. Additionally, there is a need for a door skin and a door formed from two door skins that have naturally appearing wood grain images.

SUMMARY OF THE INVENTION

An aspect of the invention provides a door skin or door facing having an exterior surface and an interior surface. The door skin can further include a wood grain pattern portion formed in the exterior surface. The wood grain pattern portion features a plurality of grooves formed in the exterior surface. The grooves are recessed from the exterior surface. Tonal portions are formed in the exterior surface. The tonal portions can comprise at least a first protrusion, a second protrusion, and a third protrusion. Spacing between the first protrusion and the second protrusion is different than spacing between the second protrusion and the third protrusion.

Another aspect of the invention provides an embossing plate for forming a wood grain pattern into a door skin, the plate being formed of metal and having a first surface. The metal plate further includes spaced ridges formed in the first surface of the plate and extending therefrom into the plate. Tonal portions are formed in the first surface of the plate. The tonal portions include at least a first depression, a second depression, and a third depression. The spacing between the first depression and the second depression is different from spacing between the second depression and the third depression.

A third aspect of the invention provides a method of etching a wood grain pattern into an embossing plate. An image of a piece of wood having a wood grain pattern, including ticks and background tones, is captured. The wood grain pattern includes ticks and background tones. A line art image associated with the ticks of the wood grain pattern is created from the image of the piece of wood. A background art image associated with the background tones of the wood grain pattern is created from the image of the piece of wood. The background art image includes at least a first pixel, a second pixel, and a third pixel. Spacing between the first pixel and the second pixel can be different than spacing between the second pixel and the third pixel. A master image can be rendered from the line art image and the background art image. A pattern transfer can be created from the master image. The embossing plate can be etched according to the pattern transfer.

Other aspects of the invention, including apparatus, articles, methods, systems, assemblies, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description, serve to explain the principles of the invention. In such drawings:

FIG. 4 is an enlarged cross-sectional view of the circled portion 22 of FIG. 1;

FIG. 5 is an enlarged perspective view of an alternative view of circled portion 2-2 of FIG. 1;

FIG. 6 is an enlarged alternative perspective view of the circled portion 2-2 of FIG. 1;

FIG. 10D is an enlarged the bitmap image (enlargement of FIG. 10E) with ticks added.

DETAILED DESCRIPTION OF THE PREFERRED EMBODIMENT(S)

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

Figure 1:
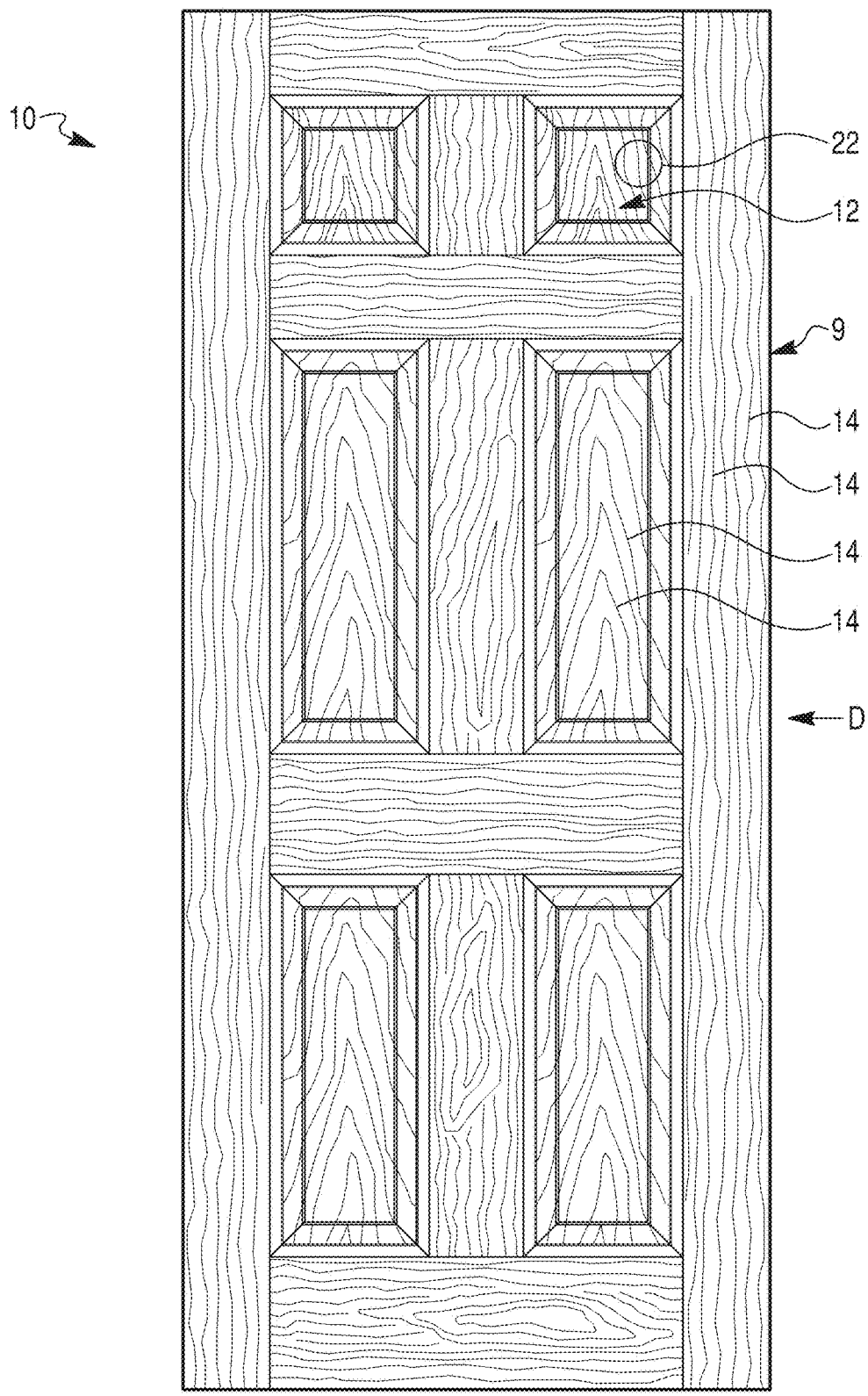
FIG. 1 is a front elevation of an exemplary door skin according to an exemplary embodiment of the present disclosure.

FIG. 1 illustrates a door D having a naturally appearing wood grain pattern 12 formed in an exterior surface 9 of a door facing 10, also known as a door skin. Facing 10 can be formed using various materials. For example, facing 10 can comprise wood composite or fiberglass reinforced polymer, such as a sheet molding compound (SMC), block molding compound (BMC), or the like.

Figure 2:
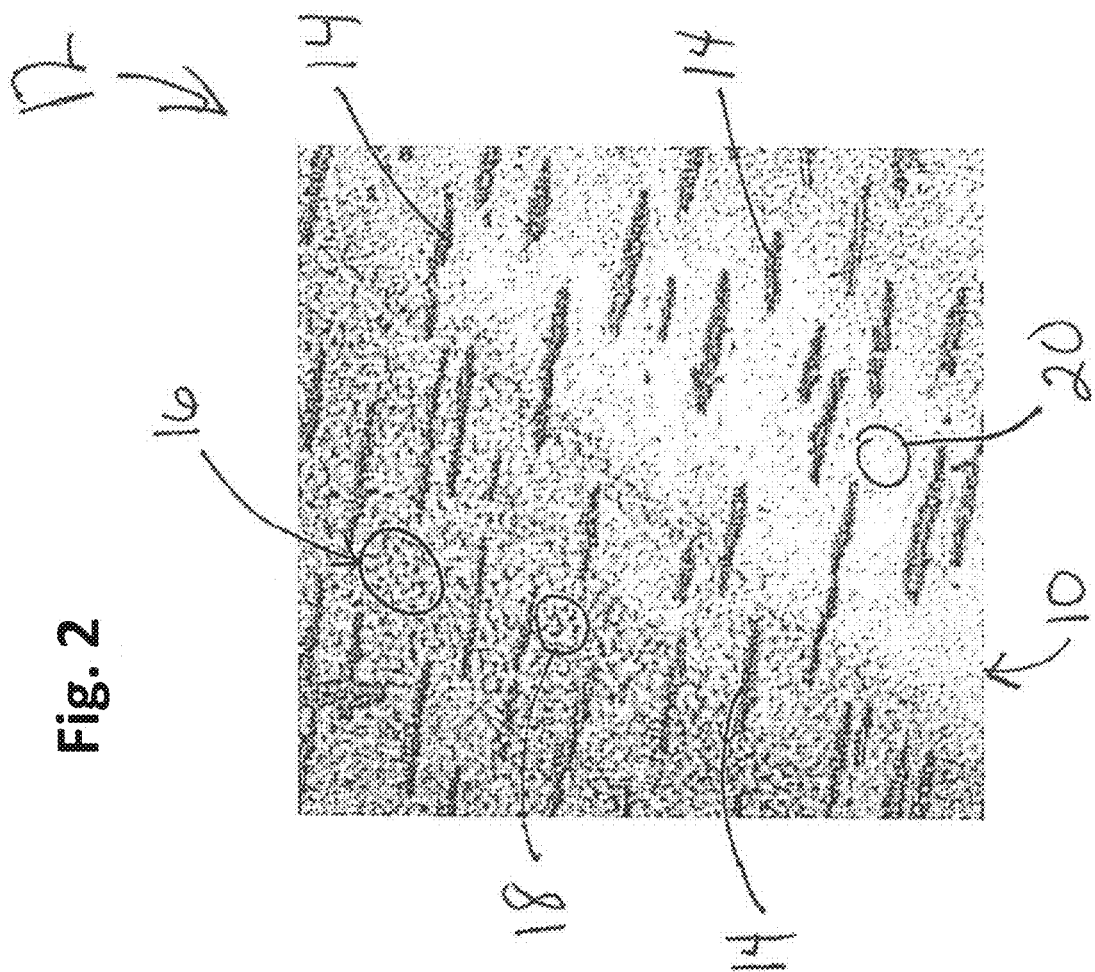
FIG. 2 is an enlarged fragmentary plan view of an exemplary wood grain pattern portion according to an exemplary embodiment of the present disclosure.

FIG. 2 illustrates an enlarged plan view of wood grain pattern 12. A wood grain pattern 12 is provided within an exterior surface 9 of facing 10. The wood grain pattern 12 includes ticks (or grooves) 14 and tonal portions 16 that are arranged to create an aesthetic and texturally pleasing and realistically appearing wood grain pattern. Particularly, tonal portions 16 include randomly spaced dot patterns that reflect a more natural wood grain pattern. The randomly spaced dot patterns include portions having various dot densities. For example, darker areas 18 of the wood grain pattern 12 have a higher density of dots because of a relatively high number of dots within a predetermined area where the dots are spaced relatively close together. The lighter areas 20 of the wood pattern 12 have a lower density because a lesser number of dots are within the predetermined area and the dots are spaced relatively further apart than the dot patterns in the darker areas 18.

Figure 3:
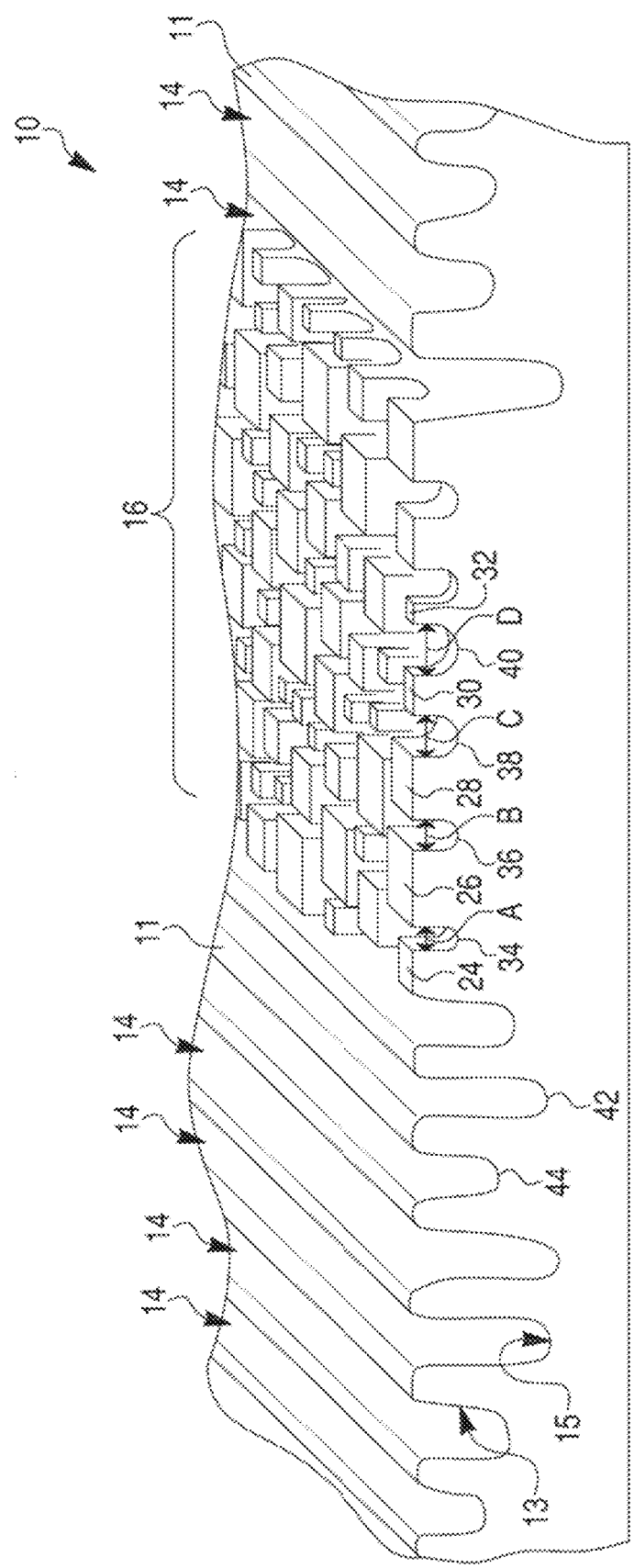
FIG. 3 is an enlarged perspective view of the circled portion 22 of FIG. 1.

The wood grain pattern formed in an exterior surface 9 of facing 10 is further illustrated in FIGS. 3 and 4. For example, FIG. 3 illustrates an enlarged perspective view of the circled portion 22 of FIG. 1 and FIG. 4 illustrates an enlarged cross-sectional view of the same circled portion. Exterior surface 9 of facing 10 of door D comprises a plurality of spaced ticks 14. Each of the ticks 14 is defined by opposing walls 13 and a base 15 interconnecting the walls 13. Opposing walls 13 can have any configuration such as sloped, curved, etc.

A plurality of outer portions 11 lie substantially on the most exteriorly disposed surfaces of facing 10. Outer portions 11 separate adjacent ticks 14. Preferably, ticks 14 are recessed from the surface 9, defined by outer portions 11, from between about 0.001 inches to about 0.003 inches, and may have variable widths. As such, outer portions 11 may also have variable widths, as best shown in FIG. 3. The depth of ticks 14 may vary from the preferred range depending on the substrate used to mold door skin D, as well as the wood species being simulated. In addition, adjacent ticks 14 may be spaced from each other by variable distances, and extend longitudinally relative to each other by variable distances, and extend longitudinally relative to each other by variable lengths.

One of ordinary skill recognizes that the configuration of the ticks 14 simulates a natural wood grain pattern. As such, each tick 14 can have substantially any length and/or width. For example, as best illustrated in FIG. 1, some ticks 14 extend the entire length of door skin D while other ticks 14 extend a predetermined distance to simulate an appearance of soft, flowing wood ticks. The wood ticks 14 contribute to the arched or cathedral appearance present in many wood species. One observing a natural wood grain pattern will see, depending upon the wood species, a series of ticks presenting a "cathedral" image, with tonal portions arranged between the ticks. The tonal portions have greater or lesser spacing and appearance, thus contributing to the overall appearance of the pattern. In oak, for example, the cathedrals are relatively large and the tonal portions also relatively large and well defined. In cherry, on the other hand, one does not normally see large cathedral formations and the tonal portions tend to be relatively small and closely arranged together.

Facing 10 further comprises background or tonal portions 16. For clarity and ease of illustration, one tonal portion 16 is illustrated in FIG. 3. However, one of ordinary skill in the art will recognize that any number of tonal portions 16 can be included in the wood grain pattern portion of facing 10. Tonal portions 16 each comprise a plurality of spaced protrusions 24, 26, 28, 30, 32 and depressions 34, 36, 38, 40 formed between adjacent protrusions. Essentially, protrusions 24, 26, 28, 30, 32 form columns in the facing 10 where the columns are spaced from each other by depressions 34, 36, 38, 40. Protrusions 24 can be randomly spaced such that depressions 34, 36, 38, 40 have various widths. For example, spacing A between a first protrusion 24 and a second protrusion 26 can be different than spacing B between the second protrusion 26 and a third protrusion 28. In addition spacing C between the third protrusion 28 and a fourth protrusion 30 can be different than spacing A and/or B and a spacing D between the forth protrusion 30 and a fifth protrusion 32 can be different from spacing A, B, and/or C. In an exemplary embodiment, spacing A has a width less than spacing B, spacing B has a width less than spacing C, and spacing C has a width less than spacing D. It is noted that the tonal portions 16 can include a pattern of protrusions and depressions that is reversed from that illustrated in FIG. 3. Specifically, protrusions 24, 26, 28, 30, 32 can be depressions and depressions 34, 36, 38, 40 can be protrusions. While protrusions 24, 26, 28, 30 and 32 are illustrated generally as rectangles, those skilled in the art will recognize that the protrusions 24, 26, 28, 30 and 32 can have any appropriate shape that serves to simulate a tonal portion.

Preferably protrusions 24, 26, 28, 30, 32 and depressions 34, 36, 38, 40 are non-uniformly arranged such that no straight channel is formed across the surface 9 and/or only one straight channel is formed in the latitudinal and/or longitudinal direction. In some embodiments, the protrusions 24, 26, 28, 30, 32 and depressions 34, 36, 38, 40 are randomly distributed in the surfacing 10. Depressions 34, 36, 38, 40 are recessed from the outer portions 11 to a depth of between about 0.0005 inches and 0.001 inches.

As best illustrated in FIG. 4, depressions 34, 36, 38, 40 can have a uniform depth. Alternatively, as best illustrated in FIG. 5, depressions 34, 36, 38, 40 can have varying depths. In an exemplary embodiment, the depth of depressions 34, 36, 38, 40 is associated with the density of the protrusions 24, 26, 28, 30, 32. For example, when protrusions 24, 26, 28, 30, 32 are arranged to have a smaller spacing between adjacent protrusions (e.g., a higher density of protrusions), the depth of the depressions 34, 36, 38, 40 between the adjacent protrusions 24, 26, 28, 30, 32 can be greater than a depression associated with adjacent protrusions spaced further apart. In an exemplary embodiment, depression 34 can have a depth of E, depression 36 can have a depth of F, depression 38 can have a depth of G, and depression 40 can have a depth of H where depth E is greater than depth F which is greater than depth G which is greater than depth H.

In another exemplary embodiment, the depth of depressions 34, 36, 38, 40 can be associated with a wood species such as ash, oak, cherry, mahogany, etc. Each type of wood species has a different wood grain pattern and each wood grain pattern has tonal portions including depressions having varying depths. One of ordinary skill will recognize that the depths of the depressions can vary from the preferred ranges, depending upon the panel substrate being embossed and/or molded and the wood species being simulated.

While protrusions 24, 26, 28, 30, 32 are illustrated in FIG. 3 as having a box-like shape configuration with flat tops, protrusions 24, 26, 28, 30, 32 can have any shape and need not all be of the same shape. For example protrusions 24, 26, 28, 30, 32 can have a cylindrical shape, oval shape, triangle shape or the like. Moreover, the protrusions 24, 26, 28, 30, 32 are illustrated as having a flat top surface, however protrusions 24, 26, 28, 30, 32 could alternatively have a concave surface, a convex surface, etc. Protrusions 24, 26, 28, 30, 32 can be flush with outer portions 11. Additionally, the protrusions need not all have the same shape. For example, protrusions 24 and 28 may have a box-like shape configuration as shown in FIG. 3, while the other protrusions 26, 30, and 32 have other shape and configurations. Further, the protrusions need not be the same size. For example, protrusions 24 and 28 may have a box-like shape with a top area of X mm$^2$, while the other protrusions 26, 30, and 32 have the same shape with a top area of Y mm$^2$. Preferably, the protrusions have a top area of about 0.0064 mm$^2$ to about 0.0625 mm$^2$. Those skilled in the art will appreciate that while protrusions 24, 26, 28, 30, 32 are illustrated as having flat top surfaces and appear to lie on a plane, the acid etching process causes surfaces, including surface 9, to have a somewhat textured configuration. Although FIGS. 3 and 4 show separate regions for tonal portions 16 and ticks 14, in certain embodiments, the protrusions 24, 26, 28, 30, 32 and the ticks 14 may be intertwined such that the protrusions 24, 26, 28, 30, 32 are located in the outer portions 11 separating adjacent ticks 14.

Tonal portion 16 can include any number of protrusions 24, 26, 28, 30, 32. In an exemplary embodiment, the number of protrusions 24, 26, 28, 30, 32 is associated with a pixel density of a processed image as described below. In an alternative exemplary embodiment, the number of protrusions 24, 26, 28, 30, 32 is based upon the type of substrate used to form door skin D and/or the type of species of wood being simulated. In yet another alternative exemplary embodiment, a maximum number of protrusions 24, 26, 28, 30, 32 is predetermined based upon unit area, such as per square inch, with about 160,000 or fewer protrusions per square inch, more preferably about 10,000 to 160,000 per square inch, where the protrusions are non-uniformly or randomly spaced. A tonal portion 16 comprising a high number of protrusions per square inch (high protrusion density) is associated with a high contrast background area of the natural wood grain pattern. A high protrusion density is about 35 to about 50% (i.e. that protrusions occupy 40-50% or the total areas), preferably about 40 to about 45%. A tonal portion 16 comprising a low number of protrusions per square inch (low protrusion density) is associated with a low contrast background area of the natural wood pattern. A low protrusion density is about 2% to about 10%, preferably about 4 to about 7%. The tonal portions not covered by protrusions are covered by depressions. Thus, the protrusion density and the depression density of a tonal portion preferably add up to 100%. One of ordinary skill in the art will appreciate that the number of protrusions/depressions can vary in different tonal portions 16 throughout the wood grain pattern. In addition, while not illustrated, one of ordinary skill in the art will appreciate that portions of the wood grain pattern can omit tonal portions 16. For example, some portions of the area between adjacent ticks 14 can omit protrusions 24, 26, 28, 30, 32 such that a bi-color or glossy appearance results after stain is applied to facing 10. Alternatively, tonal portions 16 need not be situated between adjacent ticks 14.

In an exemplary embodiment, ticks 14, protrusions 24, 26, 28, 30, 32, and depressions 34, 36, 38, 40 are configured to receive stain, such that the staining process results in a wood grain pattern that simulates a natural wood grain. For example, stain can be applied to facing 10 and varying amounts of stain accumulate within ticks 14 and depressions 34, 36, 38, 40 as well as on outer surfaces 11 and protrusions 24, 26, 28, 30, 32. Because ticks 14 are variably spaced and have variable widths and/or depths, deeper, wider ticks 42 hold more stain as compared to shallower, narrow ticks 44, as best shown in FIG. 5. In this way, the deeper, wider ticks 42 have a darker, more prominent appearance and the narrow, shallow ticks 44 simulate lighter, more delicate wood ticks. Likewise, depressions 34, 36, 38, 40 receive stain between protrusions 24, 26, 28, 30, 32 to simulate natural wood grain tonal patterns, such that the deeper depth depressions result in a darker, more prominent appearance and the more shallow depressions result in a lighter, more delicate background tonal appearance. The different spacing between the protrusions 24, 26, 28, 30, 32 (e.g., different depression widths) results in a tonal appearance that more naturally simulates the varying wood tones found in a natural wood grain pattern.

Stain can be applied to facing 10 using various techniques. For example, stain can be applied by brushing or wiping stain on the external surface of facing 10 such that stain is applied to door skin D in a manner similar to the application of stain to a piece of natural wood. Any number of coats of stain can be applied to facing 10 and any type of stain can be used. For example, a heavily pigmented stain can be used such that a single coat can cling and congeal within ticks 14 and depressions 34, 36, 38, 40. The stain is retained in the depressions and produces a darker appearance in areas where the depression density is high (low protrusion density). In the areas where the depression density is low (high protrusion density), a lighter appearance is produced.

FIG. 6 illustrates an enlarged perspective view of an alternative view of circled portion 22 of FIG. 1 according to exemplary embodiment of the present disclosure. Specifically, FIG. 6 illustrates a portion of a wood grain pattern provided in facing 10 comprising ticks 14 and protrusions 24, 26, 28, 30, 32, 34, 36, 38 where the latitudinal and longitudinal spacings I, J, K, L, M, N are different. The protrusions of FIG. 6 are more randomly sized and spaced than those of FIG. 3. For example, spacing I between protrusions 24 and 32 can be different from spacing J between protrusions 26 and 34. Spacing K between protrusions 28 and 36 can be different from spacing I and/or J. Moreover, spacing L between protrusions 24 and 26 can be different from spacing M between protrusions 26 and 34, and spacing N between protrusions 28 and 30 can be different from spacing L and/or M. In an exemplary embodiment, spacing I can be less than spacing J which can be less than spacing K and spacing L can be less than spacing M which can be less than spacing N. However, one of ordinary skill in the art will recognize that the magnitude of spacing can vary based on the pixel density generated by an image associated with a natural wood grain where the spacing is non-uniform and creates a tonal variation that more naturally replicates the natural wood grain pattern.

Although the tonal area is described herein as containing individual protrusions with interconnected depressions, the reverse is also encompassed by the present invention, where the tonal area contains individual depressions with interconnected protrusions. In the tonal areas of FIGS. 3 and 6, the depressions and protrusions could be reversed, as long as they are able to produce the desired wood grain pattern upon staining by producing dark appearances in areas with high depression densities and light appearances is areas with low depression densities.

Wood grain pattern 12 can be formed within facing 10 using various methods such as employing an etched plate, such as in an embossing plate or molded die set, or other process known in the art.

Figure 7:
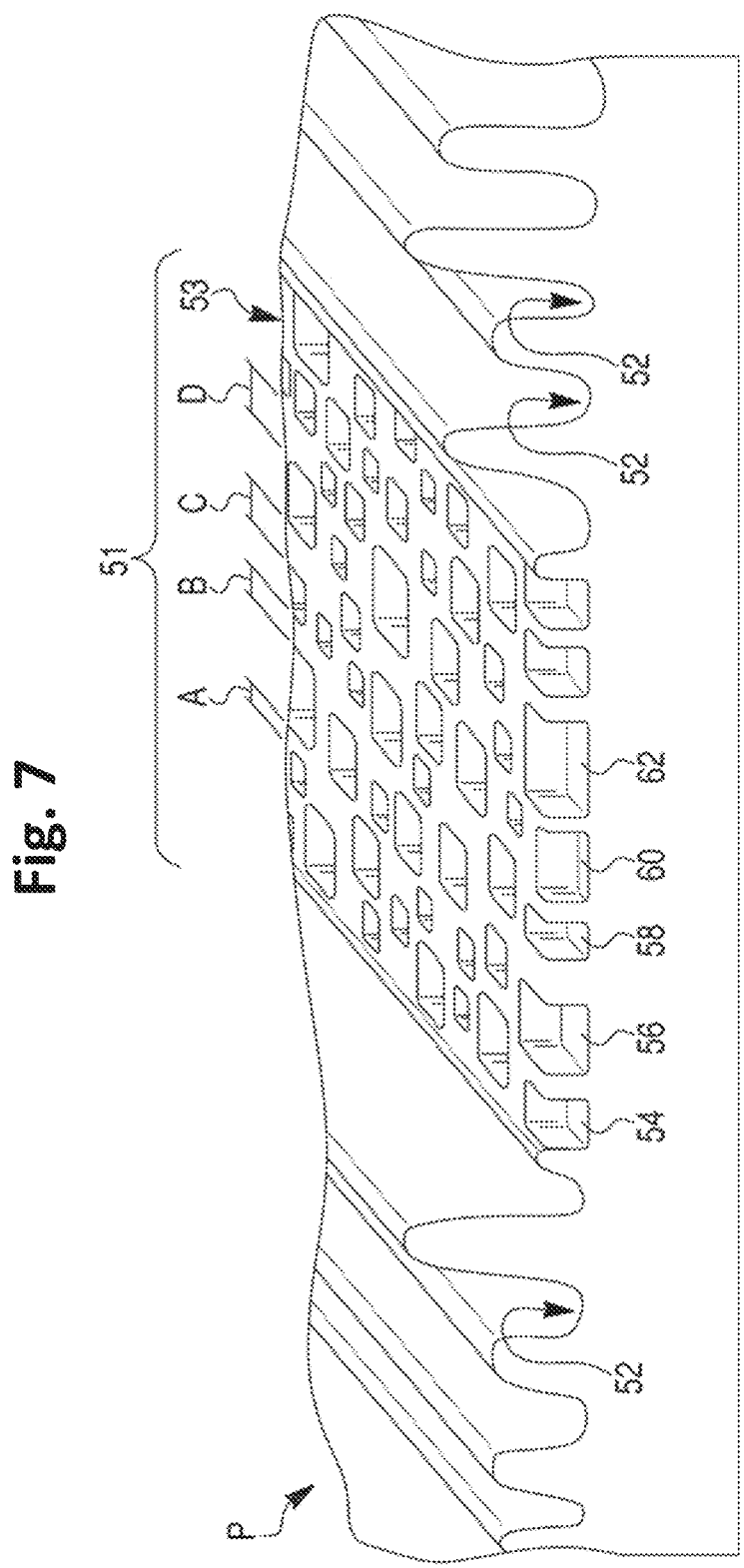
FIG. 7 is a fragmentary perspective view of an exemplary etched metal plate according to an exemplary embodiment of the present disclosure.

FIG. 7 illustrates a fragmentary perspective view of an exemplary etched metal plate P according to an exemplary embodiment of the present disclosure. Metal plate P can be manufactured using various techniques. For example, metal plate P can be etched to create an embossing plate or a mold die used to form a wood grain pattern in an exterior surface of a molded article, such as door skin D. Various etching techniques can be implemented including chemical etching, laser etching, etc.

Metal plate P is a negative-image of the wood grain pattern 12 formed into door facing 10 and is processed to include ridges 52 and depressions 54, 56, 58, 60, 62. Ridges 52 correspond to the ticks 14 formed in facing 10 and depressions 54, 56, 58, 60, 62 correspond to tonal portions 16, including protrusions 24, 26, 28, 30, 32 formed in facing 10. Depressions 54, 56, 58, 60, 62 are separated by non-uniform spaces A, B, C, D where the spacing A between depressions 54 and 56 is different than spacing B between depressions 56 and 58 which is different than spacing C between depressions 58 and 60 and spacing D between depressions 60 and 62. In an exemplary embodiment, spacing A is less than spacing B which is less than spacing C which is less than spacing D. Because metal plate P is the negative-image of the wood grain pattern formed into door facing 10, when protrusions 24, 26, 28, 30, 32 are depressions and depressions 34, 36, 38, 40 are protrusions, ridges 52 can be depressions and depressions can be ridges.

Tonal portions 51 correspond to tonal portions 16 of wood grain pattern 12. For example, tonal portion 51, as best shown in FIG. 7, includes an area 53 with a plurality of depressions 54, 56, 58, 60, 62 spaced throughout area 53. Because tonal portion 51 of plate P is an inverse configuration of the tonal portion 16 of an embossed article, depressions 54, 56, 58, 60, 62 are configured as box-like, open areas recessed from area 53. The depth of each depression varies depending on the desired height of protrusions 24, 26, 28, 30, 32 and depth of depressions 34, 36, 38, 40, the configuration of tonal portion 51 is etched into plate P to correspond to the desired tonal variations in an embossed article, such as door skin D. Similarly, the configuration of recesses 52 is configured to correspond to the desired size, shape, and depth of a desired wood tick pattern to be formed in the door skin D. Although FIG. 7 shows a plate with individual depressions and connected protrusions, the present invention also contemplates the reverse, where the plate contains individual protrusions with interconnected depressions.

Figure 8:
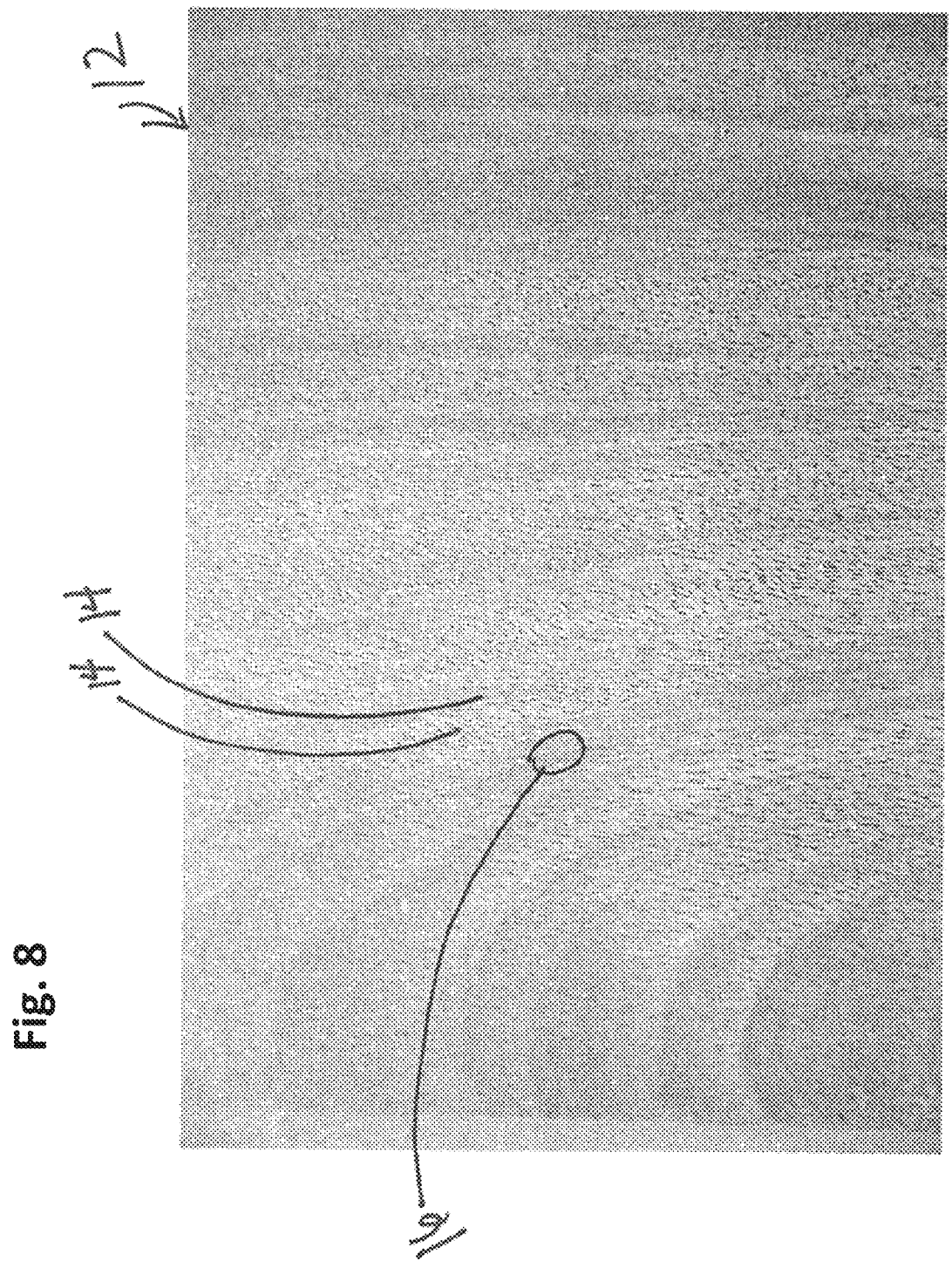
FIG. 8 is a fragmentary screen art image of an exemplary wood grain pattern portion according to an exemplary embodiment of the present disclosure.

FIG. 8 illustrates an exemplary wood grain pattern portion according to an exemplary embodiment of the present disclosure. For example, FIG. 8 illustrates a resulting wood grain pattern 12 transferred to facing 10 of door skin D using various techniques. The wood grain pattern 12 is based on a combination image comprising a wood grain pattern 12 having wood tick portions 14 and background tonal portions 16. In an exemplary embodiment, an image of a natural piece of wood is photographed to derive textures, tones, and patterns to be simulated in wood grain pattern 12. For example, each natural wood board is prepared for photography by burning and wire brushing the board surface in order to accentuate fine ticks, background color, and tone of the board. The image of the prepared board is captured using conventional photography methods. Alternatively, the image is derived using digital imaging techniques, as known in the art. A plurality of boards can be photographed, each representing a stile, a rail, and a panel of the ultimately to be produced door skin. In an exemplary embodiment, the boards may be of different wood species, so that the stiles and rails may be one species and the panels another species.

The photographs may then be assembled into the appearance of a door, with the wood gain pattern of each board oriented as desired. Thus, a naturally appearing door can be achieved, with the wood grain of the stiles oriented perpendicular to that of the rails, and the wood grain of the panel(s) oriented as desired.

The image of the naturally occurring wood grain may be altered using various photographic arts or computer imaging techniques. For example, the image may be enhanced by increasing the resolution and/or applying filters to the resulting image. In an exemplary embodiment, one or more filters such as a half tone filter, a mezzotint-like filter, a dithers filter and/or a posterizations filter, can be applied to the enhanced resolution image. The image is separated by camera or computer imaging to produce a first image associated with the ticks from the initial image and a second image associated with the wood tones from the initial image. For example, the image may be processed using a color separator, whereby the initial image is separated by camera or computer imaging to produce a first image showing the wood ticks of the initial image, and a second imaging showing the wood tones of the initial image.

The first image associated with the ticks may be enhanced using various photographic or computer imaging techniques. For example, the resolution of the first image may be increased to create an image of flowing ticks. Specifically, the size of the image can be increased to, for example, 300% to increase the resolution of the image to preferably from about 600 dpi to about 2400 dpi. In this way, the thickness of the ticks 14 is easily adjusted and spaced apart from each other to avoid etching lines in plate P that are too close together. Preferably, this adjustment involves scaling all ticks 14 shown in the image based upon the thickest tick as the baseline or reference against which all other ticks are dimensioned.

Figure 9:
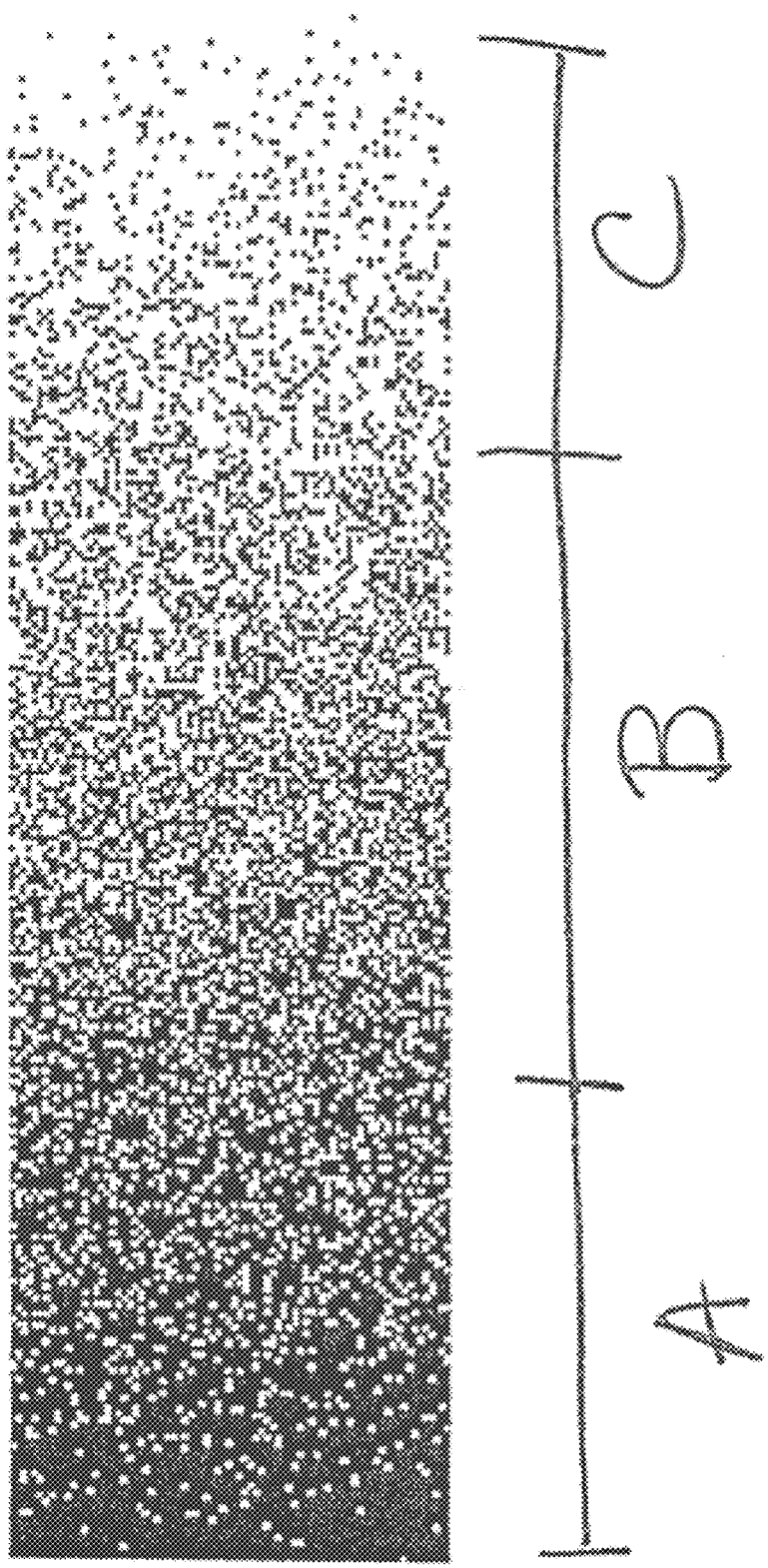
FIG. 9 is a fragmentary screen art image of a background art image used to create the screen art image of an exemplary wood grain pattern portion according to an exemplary embodiment of the present disclosure.

The second image can also be enhanced by photographic or computer modeling techniques to achieve the desired contrast and density of the wood tones. In an exemplary embodiment, the image associated with the wood tones is converted from a color image to a black and white image such that the tones are represented in gray scale pixels. At least one filter can be applied to the gray scale image to create the random dot pattern associated with the tonal portions of the wood grain pattern. For example, one or more of a half tone filter, a mezzotint-like filter, a dithers filter and/or a posterizations filter can be applied to create non-uniform tonal areas. After one or more of the filters is applied, a random dot pattern is created that includes various dot densities that better captures the subtle background tones that naturally occur in the wood grain pattern 12. For instance, the second image includes pixels that are non-uniformly spaced from each other such that pixels associated with the lighter tones of the initial image are spaced further apart from pixels associated with darker tones. An enlarged portion of the second image can include tonal portions, as illustrated in FIG. 9, where the tonal portions include pixels within area A having a denser pixel concentration than pixels within areas B and C. In an exemplary embodiment, each pixel of the second image has the same area. Alternatively, the pixels associated with the darker tones can have a larger area than the pixels associated with the lighter tones.

The first image and second image are combined to render a master image of the wood grain pattern 12, including both the wood tick portions and the background tonal portions. A pattern transfer can be created from the master image where the pattern transfer is used to assist in forming the desired wood grain pattern on the metal plate P. Metal plate P can be etched using the pattern transfer such that recesses 53 and depressions 54, 56, 58, 60, 62 are formed. Metal plate P can then be used to transfer the wood grain pattern 12 onto facing 10.

Figure 10A:
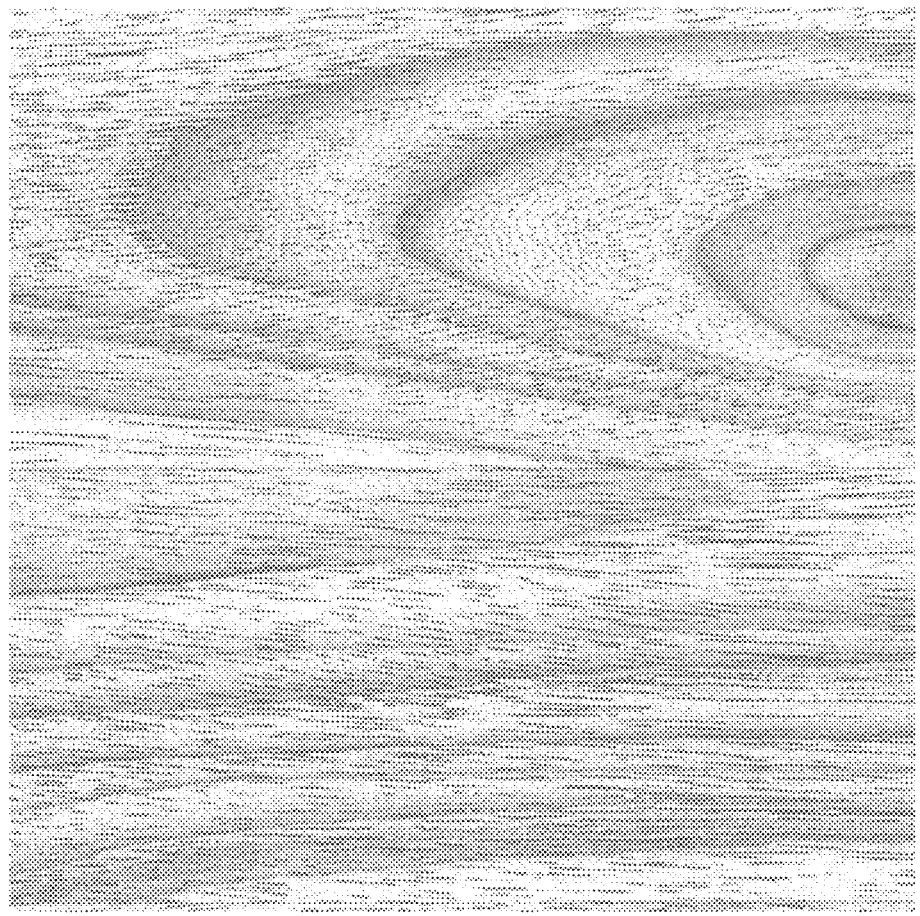
FIG. 10A is a grayscale scan image of a wood pattern.
Figure 10B:
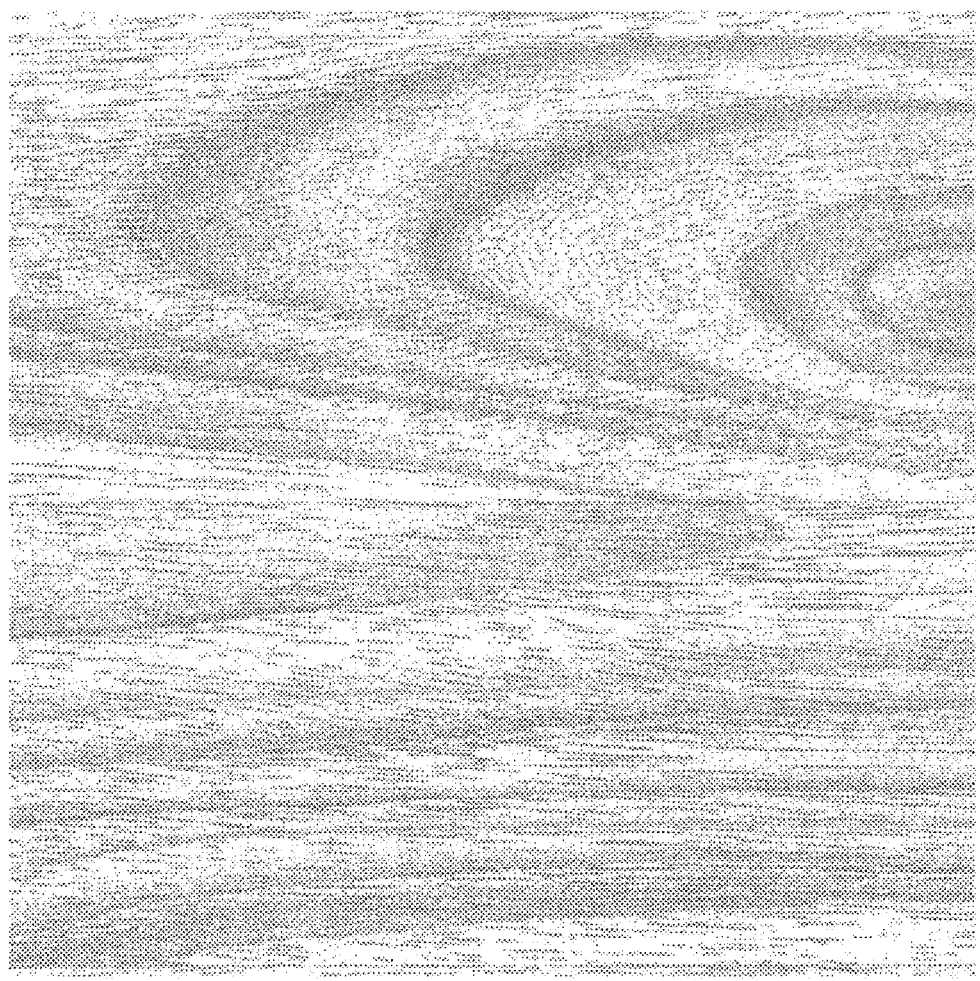
FIG. 10B is a bitmap image of the wood pattern.
Figure 10C:
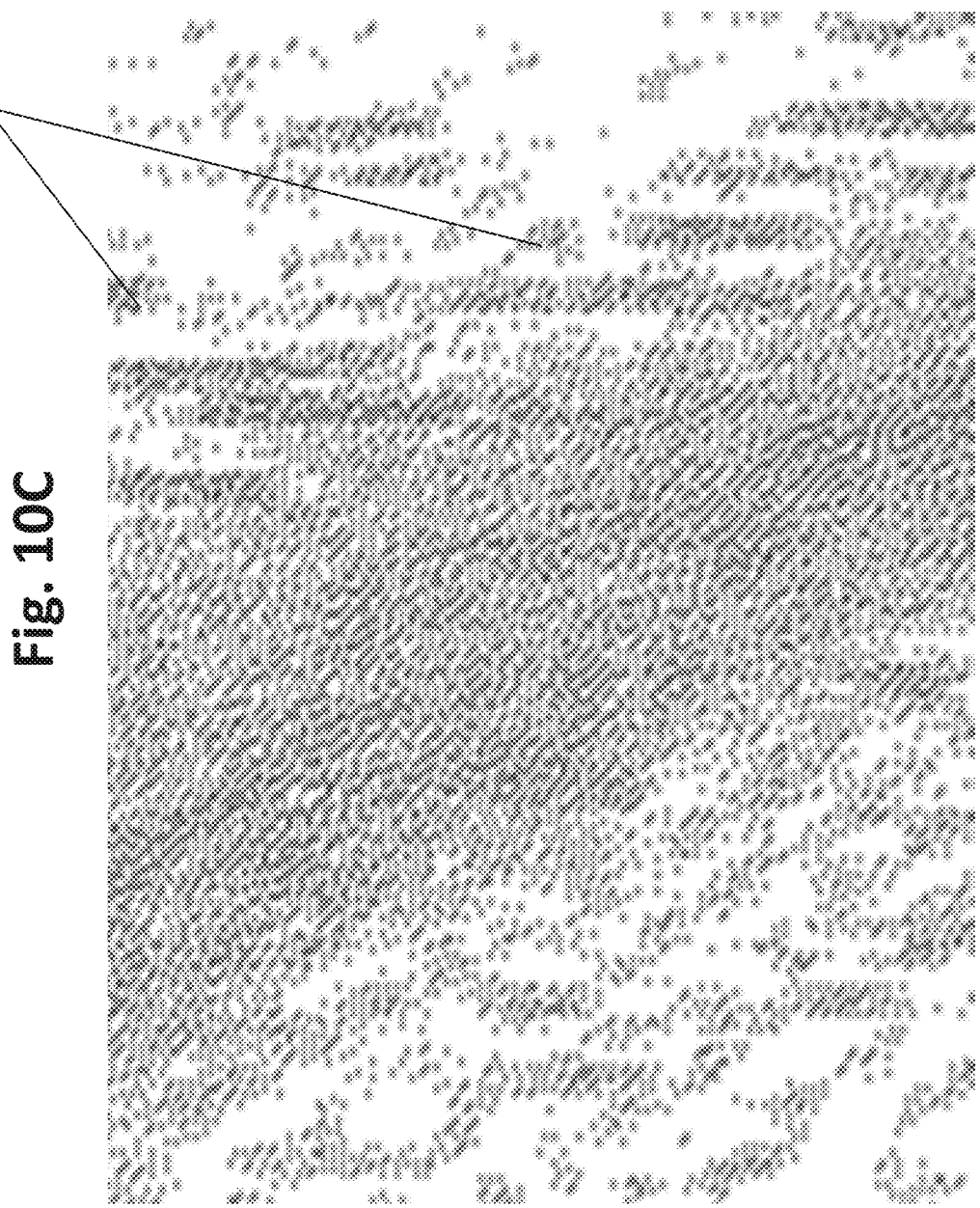
FIG. 10C is an enlarged image of the bitmap image of FIG. 10B.
Figure 10E:
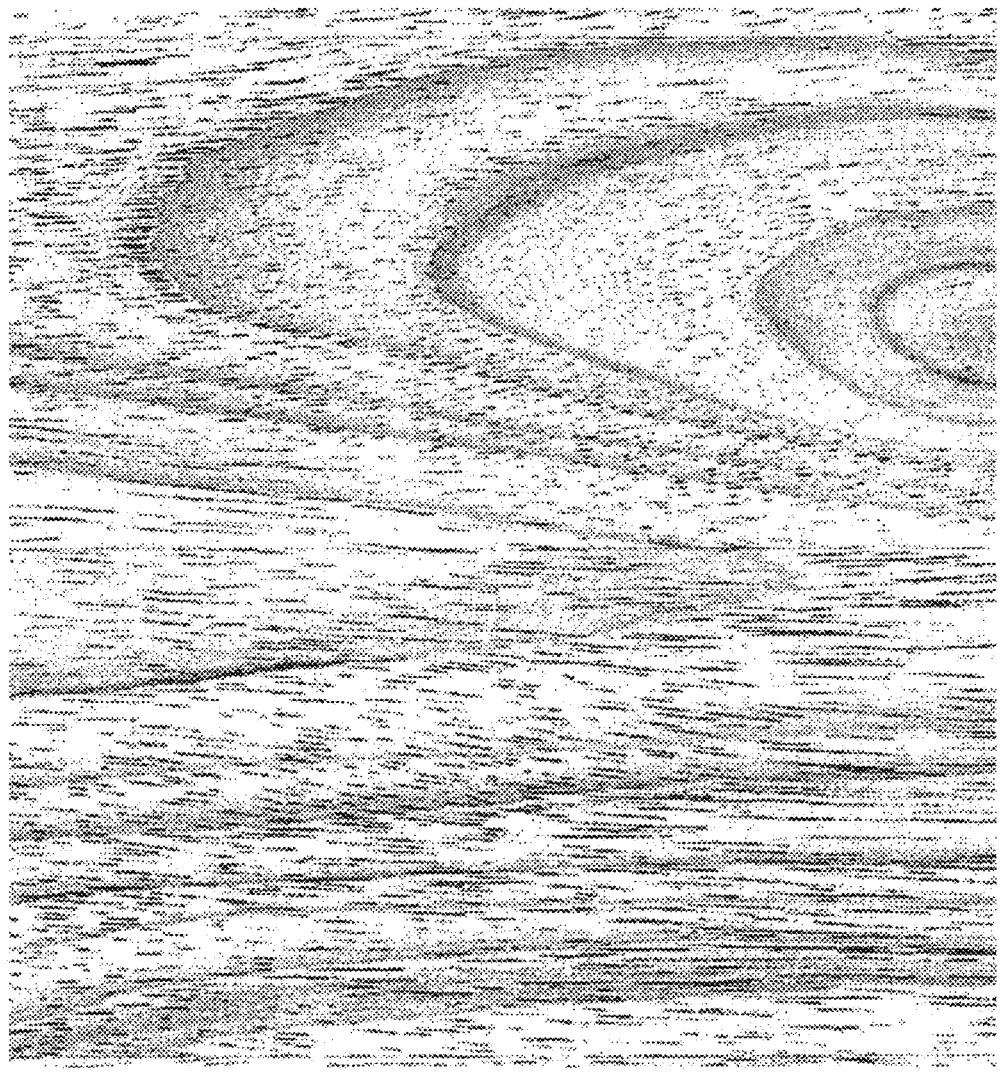
FIG. 10E shows the final bitmap image with ticks added that is used to make the metal plates.

In an exemplary embodiment, an image is rendered by first scanning the wood grain in grayscale (FIG. 10A). Alternatively, if scanned in color, the color scan may be converted to grayscale using software available in the art. The grayscale image is then converted to a bitmap image (FIG. 10B) which is made up of pixels. FIG. 10C is an enlarged portion of the bitmap image of FIG. 10B, which shows that the bitmap image is made up of a plurality of pixels (dots) 110. Areas where the pixels are very close together are ticks and areas where the dots are further apart are tonal areas in the original wood. The bit map image is then enhanced to add ticks 112 to portions where the dots are very close together (FIG. 10D). The ticks are enhanced as dark lines 112 instead of individual dots that are very close together. The final enhanced image is shown in FIG. 10E, which is then used to make plates, e.g. by acid etching. In the plates, the individual pixels 110 in the image are rendered as protrusions, and the dark lines 112 are rendered as raised ridges.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. An embossing plate for forming a wood grain pattern into a door skin, the embossing plate comprising:
   a) a plate having a first surface;
   b) a plurality of ridges formed on the first surface; and
   c) tonal portions formed in the first surface of said plate, the tonal portions comprising a plurality of depressions, wherein spacing between at least some of the depressions have different widths and at least some of the depressions have different depths.

2. The embossing plate of claim 1, wherein the tonal portions comprise at least a first depression, a second depression, and a third depression, wherein spacing between the first depression and the second depression is different than spacing between the second depression and the third depression.

3. The embossing plate of claim 1, wherein the ridges are raised from the first surface by about 0.001 inches to about 0.003 inches.

4. The embossing plate of claim 1, wherein the depressions are arranged randomly in the exterior surface.

5. The embossing plate of claim 1, wherein the depressions are separated from each other by protrusions.

6. The embossing plate of claim 5, wherein the depressions have depths of about 0.0005 inches to about 0.001 inches.

7. The embossing plate of claim 1, wherein some of said tonal portions are disposed between adjacent ridges.

8. The embossing plate of claim 1, wherein the depressions are randomly distributed.

9. The embossing plate of claim 1, wherein the depressions have flat bottom surfaces that are rectangular, triangular, oval, or circular shape.

10. The embossing plate of claim 1, wherein the depressions have different bottom surface areas.

11. The embossing plate of claim 10, wherein the bottom surface areas of the depressions range from about 0.0064 mm$^2$ to about 0.0625 mm$^2$.

12. The embossing plate of claim 1, wherein the depressions have convex or concave bottom surfaces.

13. The embossing plate of claim 1, wherein the depressions in areas of higher depression density have greater depth than the depressions in areas of lower depression density.

14. The embossing plate of claim 1, wherein the depression density of the depressions is about 10,000 to about 160,000 per square inch.

15. The embossing plate of claim 1, wherein the depressions are separated from one another by interconnected protrusions.

16. The embossing plate of claim 15, wherein the interconnected protrusions are non-uniformly arranged.

17. The embossing plate of claim 1, wherein the embossing plate is made of metal.

18. The embossing plate of claim 1, wherein the depressions are box shaped.

19. The embossing plate of claim 1, wherein the plurality of ridges formed on the first surface are arranged in an inverse configuration to a plurality of grooves simulating an appearance of wood ticks.

20. The embossing plate of claim 19, wherein the depressions formed in the first surface of said plate are arranged in an inverse configuration to a plurality of protrusions simulating an appearance of wood background tone.

* * * * *